INVENTOR.
Nicholas C. Christofilos

United States Patent Office 3,708,391
Patented Jan. 2, 1973

3,708,391
HIGH POWER DENSITY CONTROLLED FUSION REACTOR
Nicholas C. Christofilos, Livermore, Calif., assignor to the United States of America as represented by the United States Atomic Energy Commission
Filed Sept. 20, 1971, Ser. No. 181,914
Int. Cl. G21b *1/00*
U.S. Cl. 176—4                                    9 Claims

ABSTRACT OF THE DISCLOSURE

An Astron fusion reactor wherein a reaction plasma is contained in a magnetic potential well created by the interaction of the magnetic field generated by a cylindrical E-layer of relativistic charged particles rotating in an axisymmetric poloidal magnetic field. Molten lithium is pumped along an elongated annular region of the poloidal field surrounding the reaction plasma exterior of the E-layer to serve as a blanket for absorbing the neutron flux from the reaction plasma to generate heat and to breed tritium therein. The heated lithium is circulated into heat exchangers to produce steam for power generation and is treated to recover tritrium for recycle or other use. Power densities several fold greater than with conventional blanket configurations may be utilized.

BACKGROUND OF THE INVENTION

Figure 1:
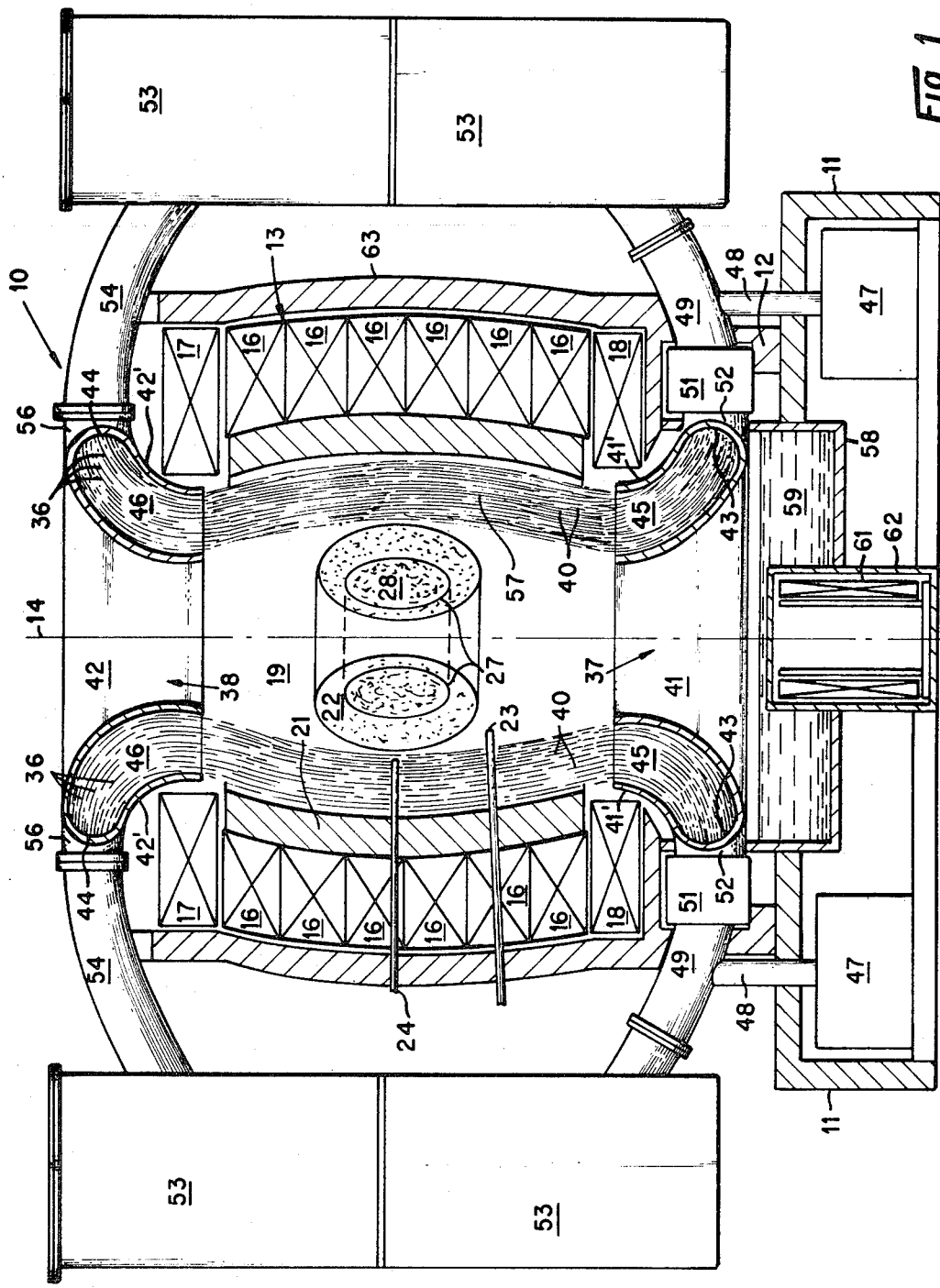

This invention was made under, or in the course of USAEC Contract No. W–7405–ENG–48 with the United States Atomic Energy Commission.

Astron type fusion reactor devices have been disclosed heretofore, for example, in my U.S. Pat. No. 3,071,525 issued Jan. 1, 1963 entitled "Method and Apparatus for Producing Thermonuclear Reactions." Therein an elongated axially symmetric or poloidal axisymmetric magnetic field having a central uniform intensity and terminally intensified magnetic mirror regions is established in an evacuated vessel. Relativistic electrons are injected tangentially and are trapped by manipulation of magnetic field regions in the injection region, or by another method described in my U.S. Pat. No. 3,036,963 issued May 29, 1962, using resistors arranged along the injection region to form a cylindrical sheath or E-layer of relativistic electrons rotating about the axis of the uniform field between the mirror regions. The magnetic field of the E-layer interacts with the external field to produce a system of closed magnetic field lines defining a containment zone for retaining a fusion reaction plasma. An Astron reactor wherein a positive charged particle E-layer, e.g., a relativistic proton E-layer is established, by injection and dissociation of molecular ions to form the charged particles, is disclosed in my copending application Ser. No. 868,287 filed Oct. 16, 1969 and entitled "Proton E-layer Astron for Producing Controlled Fusion Reactions," now U.S. Pat. No. 3,664,921 issued May 23, 1971. Moreover, certain advantageous operating parameters for an Astron reactor are disclosed in a paper entitled "Astron Plasma Parameters Confined in the Closed Well of a Proton E-layer," Nicholas C. Christofilos, Proceedings of Energy 70, the Interscience Energy Conversion Engineering Conference, Las Vegas, Nev., Sept. 21–25, 1970.

In each of the foregoing Astrons and in others disclosed heretofore, fuel materials such as electrically neutral gaseous, liquid or solid forms comprising fusionable light nuclides are introduced into the magnetic field to interact with the relativistic charged particles to form a fusion reaction plasma trapped in said containment zone. The energy released by the fusion reactions emerges partially in radiant forms with significant to major portions appearing in the kinetic energy of energetic charged particle and energetic neutron particle fluxes. With the reaction $D+T\rightarrow {}^2He_4+n$ about 80% of the reaction energy output is carried off by the neutrons. It has generally been proposed to recover the neutron energy in various blanket arrangements arranged outwardly from the containment field. It is usually preferred to employ a lithium blanket in order that tritium may be generated simultaneously to be available for recycling.

Blanket structures proposed, heretofore, for example in said paper presented at Energy 70, such blanket systems generally use walled vessels, e.g., niobium walled vessels, tubes or the like for containing the lithium. A material such as niobium is selected on the basis of chemical inertness and neutron economy. Unfortunately it has now been perceived that niobium and possibly other candidates suitable on the foregoing bases becomes extremely radioactive under prolonged exposure to the 14 mev. neutron flux emerging from the reaction zone. The persistent radiation level may approach that residing in an expended nuclear reactor core thereby negating one potential advantage of a fusion reactor, i.e., a low radiation level when the reactor is not in operation. Moreover, the maximum tolerable thermal load limit on a blanket surface even using the most advanced constructional practice is of the order of 60–65 megawatts/sq. meter (mw./m.$^2$) which therefore requires a great increase in vessel size, blanket surface area, magnet size, electrical energy required to energize the magnet, cooling requirements and other factors over what might be required in the absence of the requisite container material.

SUMMARY OF THE INVENTION

This invention relates, generally, to controlled fusion reactors and, more particularly, to a fusion reactor, e.g., of the Astron type wherein an improved blanket arrangement involving the passage of molten lithium along an annular portion of the magnetic field surrounding the plasma to directly intercept the neutron flux is provided.

Astron type controlled fusion reactors are especially suitable for practice of the invention and specific reference will be made thereto in the following description. However, a liquid metal blanket or heat exchanger system may be provided in other types of controlled fusion reactors.

An Astron type reactor suitable for practice of the invention generally comprises an elongated electrically energized solenoid having a central linear or outwardly bowed portion of substantially uniform ampere turns distribution and end sections having an increased ampere turns distribution. The solenoid produces an axially symmetric or axisymmetric poloidal external magnetic field within an evacuated chamber within the solenoid, said chamber having a central region of relatively lower uniform field intensity with terminally intensified field regions somewhat similar to the so-called magnetic mirror fields. Means are provided for directing a suitable beam of relativistic, i.e., high energy particles into the external magnetic field together with means for trapping such particles to form a cylindrical or toroidal layer of relativistic charged particles rotating about the axis in the central external magnetic field region. The charged particle layer may comprise electrons at relativistic energies up to about 50 mev. as set forth in my above-identified patents or positively charged particles such as protons ($^1H^+$), deuterons ($^1D^+$), tritons ($^1T^+$), ($^2He_3^+$), ($^2He_4^+$) or other suitable light nuclide ions as set forth in my above-identified copending application. The magnetic field of the E-layer interacts with the external field to produce a system of closed magnetic field lines which define a toroidal zone suitable for the containment of a high temperature fusion reaction plasma. Operating parameters for Astron reactors may range over wide ranges depending on the use intended. Central magnetic field intensities may range from a few hundred gauss, e.g., 500 gauss in laboratory devices to as high as can be attained in practice, i.e., 250 kilogauss or more. Typical values for large scale devices may well be selected in the range of about 50 to 200 kilogauss. The ratio of the mirror field intensity to said central field intensity may range from about 1.1 to 3.0. Relativistic particle energies may range from about 1 mev. for electrons to several bev. for positively charged light nuclide ions. Plasma temperatures may range upwardly of about 5 kev. for the T–D reaction in power generators but may be lower in experimental machines. Plasma densities may range up to a few units times $10^{15}$ particles/cc., e.g., $1-5 \times 10^{15}$.

Further means are provided for introducing appropriate fusionable fuel nuclides generally in a neutral solid, fluid or gaseous form into the E-layer region to interact with the E-layer particles to be ionized, trapped and heated to form a fusion reaction plasma disposed in said containment zone. A preferred reaction plasma comprises tritium-deuterium mixtures suitable for undergoing the reaction.

$T + D \rightarrow {}^2He_4 + n$ as mentioned hereinbefore. With such a reaction about 80% of the energy resides in the kinetic energy of the 14.1 mev. neutrons which are produced and which emerge from the containment zone. The remainder of the energy resides principally in the kinetic energy of the alpha particles (${}^2He_4{}^+$) which are confined by the containment field and which is available for heating the plasma to maintain the reaction and/or comprise at least a portion of the energetic charged particles available for direct electrical or thermal cycle energy recovery.

For recovering the energy residing in the energetic neutrons and for breeding tritium therefrom, in accordance with the invention, there is provided a molten lithium metal blanket confined by the external magnetic field in an elongated annular body surrounding the plasma in a location appropriate to directly intercept the neutron flux, i.e., with no extraneous material walls being situated between the blanket and the plasma. The external magnetic field is thereby made to serve as the blanket vessel thereby eliminating the energy density limitations and radioactive activation problems associated with use of a solid blanket vessel wall. To accomplish the foregoing an annular header or manifold is disposed in corresponding positions in each of the magnetic mirror field regions. The magnetic field lines in the external magnetic field extend along parallel coextensive paths from one end to the other of the external field although the spacing relative to the axis may vary. Accordingly, the magnetic field lines always occupy corresponding positions along the length of the axial field. Moreover, a pumped conductive fluid, e.g., a liquid metal introduced at a terminal position in the field, e.g., by means of one of said headers, will be confined to flow along the field lines without a significant displacement thereacross and therefore the pumped liquid metal introduced into a first of said manifolds will be confined by the magnetic field to flow therealong and be discharged from the second situated as described above. Using lithium as the liquid metal the kinetic energy of the energetic neutrons is converted into heat deposited in the lithium and portions of the lithium is converted by nuclear reaction with the neutrons into tritium.

In effecting the foregoing, a small fraction of the lithium is vaporized but the E-layer serves as a shield to prevent vaporized lithium from entering the confined plasma. Energy densities at least tenfold greater than with solid vacuum or blanket walls can be tolerated thereby permitting the size of the reactor to be greatly decreased for equivalent output with a corresponding economic saving. The heated lithium is pumped, e.g., through a heat exchanger or an appropriate steam generator used to drive electrical generating equipment or for process heat; the lithium is treated for tritium recovery as in conventional nuclear reactor tritium producers and the cooled lithium is recycled as needed.

Accordingly, it is an object of the present invention to provide an improved liquid metal blanket system for a controlled fusion reactor.

Another object of the invention is to provide a liquid metal blanket system for a controlled fusion reactor which does not utilize solid material disposed in the fast neutron flux emerging from the reaction zone.

Still another object of the invention is to provide an Astron molten lithium metal blanket system utilizing the magnetic field of the reactor to confine the molten lithium blanket material to a flow path surrounding the fusion reaction zone to undergo nuclear reactions with and convert lithium into tritium thereat.

Figure 2:
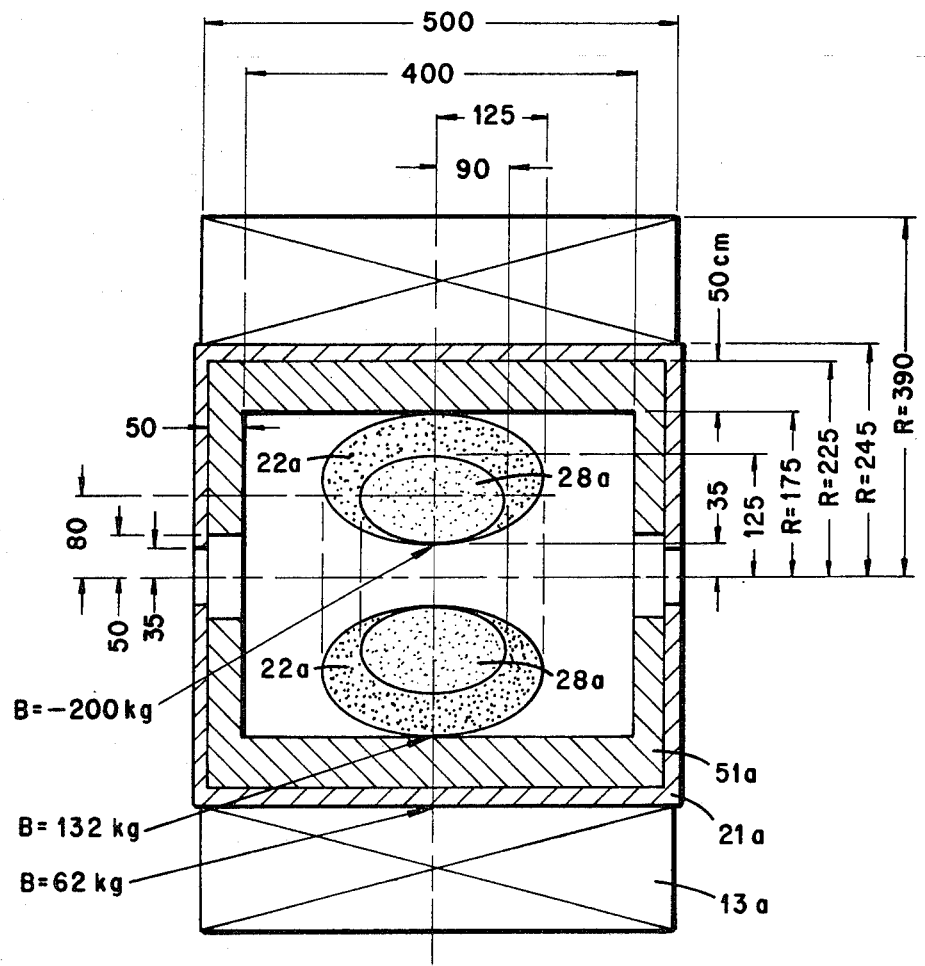

Other objects and advantageous features of the invention will be apparent in the following description and accompanying drawings, of which:

FIG. 1 is an elevational sectional view of an Astron controlled fusion reactor provided with a molten lithium metal blanket in accordance with the invention; and FIG. 2 is a simplified illustration of a specific Astron embodiment including dimensions and operating parameters relative to the specific example given in the specification.

DETAILED DESCRIPTION OF THE INVENTION

In FIG. 1 of the drawing there is shown an embodiment 10 of an Astron type controlled fusion reactor provided with a magnetic field constrained molten lithium blanket in accordance with the teachings of the invention. The reactor 10 is constructed upon a foundation base 11 having pedestal portions 12 projecting upwardly therefrom to support a solenoid 13 thereon. The solenoid 13 is preferably constructed as a stacked series of solenoid segments arranged coaxially along vertical axis 14 to avoid bending due to gravitational stresses and otherwise to facilitate construction. Due to improved efficiencies afforded by the present blanket system low cost conductor materials such as aluminum which is also suitable for use in a neutron flux may be used in constructing the solenoid. Moreover, the solenoid 13 may be cooled using a conventional coolant such as water without resort to cryogenics, or the use of shields, etc., required with superconducting coils. Central portions of solenoid 13 is constructed of a series of sections 16 having a substantially uniform ampere turns distribution per unit length and upper and lower end sections 17 and 18, respectively, having a relatively increased ampere turns per unit length. Accordingly, a typical external Astron axisymmetric or poloidal magnetic field having a linear central region of uniform field intensity bounded by terminal regions of increased magnetic field intensity is created in the chamber 19 enclosed by the solenoid upon energization with direct current furnished by a power supply (not shown). The central portions of the solenoid may be bowed outwardly while the terminal regions may be constricted somewhat, as shown, to provide field line curvatures favoring centering of the E-layer and more complete enclosure of the reaction plasma created as described more fully hereinafter.

An annular electrically conductive shell 21, e.g., of aluminum is disposed concentrically within the central portion of solenoid 13 enclosed by solenoid sections 16 between end sections 17 and 18. Such a conductive shell is required to satisfy a condition necessary for stability of the E-layer. Since a small residual portion (a few percent, e.g., 2–4%) of the fast neutron flux impinges thereon moderating heating occurs therein and cooling as by means of circulation of a liquid coolant (water) is needed to avoid overheating.

Means for injecting relativistic energy particles to be trapped to form an E-layer 22 in chamber 19 is also necessary for operation in accordance with the Astron concept. Such means may include a beam guide tube 23 extending into chamber 19 inclined centrally at a slight angle, e.g., 10–15° to a transverse plane and tangentially to a circle centered on axis 14 proximate one end of the E-layer. In the event that relativistic positively charged particles such as $H^+$, $D^+$, $T^+$, $He_3^+$ or other light nuclide ion is to be employed to form the E-layer, the selected nuclide may be injected as a beam of negative ions, e.g., $D^-$; as a beam of molecular ions, $H_2^+$, $D_2^+$; or as a beam of energetic neutron particles, e.g., $H^0$, $D^0$, etc. The energetic particles are supplied from an appropriate source (not shown) generally including a low energy ion source, particle accelerator, and gas cell neutralizers for creating the indicated ionized or neutral particle state and excited states which may be necessary as in conventional fusion reactor practice including Astron practice disclosed heretofore. The injected particles are ionized and/or dissociated by Lorentz forces or collisional processes with residual gas, plasma or specially introduced ionization media to undergo an effective change in charge to mass ratio so that the resultant positive ions are trapped in the described external magnetic mirror field to form the E-layer 22. The E-layer 22 is of a generally elliptical cross section toroidal form centered coaxially within chamber 19. Relativistic electrons may also be utilized to form an acceptable E-layer by methods and means disclosed in above-referenced patents of N. C. Christofilos.

In connection with the use of a positive ion E-layer, it may be noted that more stable plasma confinement may be attained under conditions providing a deep current well region 27 in addition to the closed magnetic field well or pattern provided by interaction of the magnetic field of the E-layer with the external field long familiar in Astron practice. The deep current well may be achieved by providing that the azimuthal velocity of the E-layer particles is small, e.g., one third of the maximum value, at the bottom of the current well. As a consequence the velocity distribution of the E-layer particles has a strong transverse component in the radial and z- (axial) direction resulting in a high transverse pressure. In order to magnetically contain E-layer particles having a high transverse pressure the self-generated magnetic field of the E-layer must be larger than the external magnetic field generated by the solenoid 13. Further reference explanatory of the foregoing is directed to a paper by T. Kenneth Fowler et al., "Stability of E-layer and Plasma in Astron Configurations, Proceedings Conference on Plasma Physics and Controlled Nuclear Fusion Research," Novosibirsk (International Atomic Energy Agency, Vienna, 71, 981, 1969).

A suitable means for introducing neutral solid, liquid or gaseous fusionable light nuclides may include an injection tube 24 entering through sidewall defining chamber 19 in a position suitable for entry into region 27 to form a controlled fusion reaction plasma 28 therein. For example, frozen DT pellets or droplets, DT neutral particle beams, DT gas mixtures, etc., can be injected from sources (not shown) to form an appropriate plasma. Region 27 corresponding substantially to the deep current well mentioned above defines the plasma containment zone of the reactor 10. Current well region or zone 27 has a generally elliptical cross section toroidal configuration of smaller major diameter then E-layer 22 and is nested concentrically therein with a common boundary therewith along the inner peripheries thereof.

Astron type controlled fusion reactors generally as typified by that described in the foregoing may be provided with a molten lithium blanket in accordance with the invention. The magnetic field lines of the external magnetic field produced by solenoid in an annular flux bundle region situated inwardly of conductive shell 21 and extending beyond end solenoids 17 and 18 have properties adapted for this purpose. More particularly, in the flux bundle area of principal interest, as represented by magnetic field lines 36, the magnetic field lines extend symmetrically in substantially parallel relation from the central uniform intensity field region curving axially inward somewhat in the constricted magnetic mirror field regions produced by solenoid segments 17, 18, and diverge considerably in the decreasing intensity field region external to the magnetic mirror field regions which is inherent in solenoid produced fields including magnetic mirror fields used in the Astron. It may be noted that while the field lines occupy varying radially spaced locations from place to place in the field that they occupy the same relative positions with respect to each other.

Now if a conductive fluid such as a liquid metal is directed as by pumping from one end location to flow parallel to the field lines in such a magnetic field the flow path of the fluid is constrained to follow the annular bundle of magnetic field lines to emerge at a corresponding location at the other end of the magnetic field provided that the field intensity is sufficient. In other words, the conductive fluid cannot cross field lines but may flow with little impedance therealong. However, in magnetic field areas of lower intensities, e.g., outwardly of the magnetic mirror fields the conductive fluid may flow across the field lines with considerably less impedance. The foregoing properties of the magnetic field are utilized by providing an input header or manifold 37 at the lower end of reactor 10 while an output header or manifold 38 is provided at the upper end. This arrangement permits introduction and withdrawal of a conductive fluid, typified by molten lithium 40 which is caused to flow along the annular field region including magnetic field lines 36 to constitute a blanket 57 proximate the shield wall 21.

Manifolds 37 and 38 include inner and outer bell shaped members 41, 41', 42, 42', respectively, arranged in spaced coaxially nested relation. The inner ends of members 41, 41', 42, 42', terminate inwardly of the magnetic mirror field regions while the outer ends terminate in a curved wall 43, 44, respectively, situated axially outward of mirror solenoid 18, thereby defining bell shaped plenums 45, 46, respectively, in manifolds 37, 38. The bell shaped members are constructed in such a manner that the plenums 44, 46 have a curvature accommodating the magnetic field lines 36 in the intensified mirror field regions and outwardly for at least a short distance. Reservoirs 47 contain lithium metal which is heated initially, at least, to above the melting point as by inductive or direct heating means. The molten lithium may be withdrawn from the respective reservoirs through conduits 48 into a main heat exchange circuit conduit 49 by means of pumps (not shown) or by pressurizing reservoirs 47 with an inert gas to fill the complete heat transfer circuit. The pumps 51 may then circulate the molten lithium from circumferentially spaced conduits 52 connected to wall member 43 into lower portions of heat-exchanger, steam-generator units 53. After passage through units 53, the molten lithium which has been cooled by heat transfer is discharged from each unit 53 through a heat exchange circuit conduit 54 through a conduit section 56, connected to curved wall member 44 to enter plenum 46. A plurality of such conduit sections 56 are distributed circumferentially along wall 44 in matching relation to conduits 52. In the relatively lower intensity magnetic field region present in entrance region of plenum 46 the molten lithium may distribute circumferentially to then flow axially downward parallel to the field lines in the more intense field region in the lower portions of plenum 46. Therein guidance of the flow by the manifold header walls 41, 42 diminishes to the vanishing point and guidance now is taken over by the annular flux bundle of magnetic field lines 36. The molten lithium flowing therealong between the magnetic mirror fields of solenoids 17, 18 serves as the principal blanket region 57 of the reactor 10. After passage through central portions of the magnetic field the stream of molten lithium, now heated to a higher temperature by interaction with the neutron flux and containing tritium produced thereby, enters plenum 45 where containment and guidance thereof is now transferred to the structural wall members 41, 41' of manifold header 37.

The heated lithium may then be withdrawn through a conduit 52 into a pump 51. A plurality of conduits 52 are distributed circumferentially to connect with manifold 37 at locations corresponding to those of conduits 56 and forming therewith portions of a main heat exchange circuit as described above.

While basic elements required for operation of the heat exchange circuits were described above, it will be appreciated that in a practical operating system the indicated circuits will be evacuated and that valving (not shown) may be needed to regulate flow of molten lithium into and out of conduits 48 leading to reservoirs 47. The reservoirs 47 might also be rearranged to accommodate a sufficient volume of molten lithium so that portions thereof could be heated during pulsed operation and returned directly to the reservoir while a separate circuit could be used to circulate the molten lithium through the steam generators continuously.

A significant portion of the neutron flux emanating from reaction plasma 28 also emerges through the lower port opening defined by manifold member 41. A sump 58 may be provided in base 11, in which a pool 59 of molten lithium is disposed across said port subjacent the lower end of manifold member 41 to intercept the neutron flux emergent therefrom. The lithium may be recirculated from pool 59 by means of a pump (not shown) through external heat exchangers or other processing equipment (not shown).

A significant amount of energy also resides in the charged particles of the plasma 28, for example, at the conclusion of a reaction cycle. The charged particles escaping from the reaction plasma 28 during operation or at the conclusion of the reaction tend to escape with about equivalent probability through lower and upper port areas defined by manifold members 41 and 42, respectively. These charged particles may be made to escape preferentially through the upper port by arranging a solenoid 61 coaxially in a housing 62 with the upper end projecting into pool 59 and being coaxially disposed subjacent said lower port defined by member 41. A pulse of electrical current from a source (not shown) creates a magnetic field which reinforces that of solenoid 18, say to an intensity of about 1.5 times or more, increasing the reflectivity thereof so that the charged plasma particles are now discharged through the upper port defined by manifold member 42.

The discharged plasma particles may then be directed into a target heat exchanger (not shown) to superheat steam from generators 53, or into a direct electrical conversion system (also not shown) or into other appropriate system for generating power or recovering the residual products. Vacuum pumping systems may also be connected to said upper port to produce vacuums below about $10^{-6}$ mm. Hg in chamber 19 as in conventional fusion reactor practice. A jacket 63 of, e.g., of magnetically permeable metal may be disposed exterior of solenoid 13 to provide a vacuum vessel.

In summary, in usual operation solenoid 13 is energized to create the external magnetic mirror type field and molten lithium is transferred from reservoir 47 to fill the heat transfer circuit and create the blanket region 57. Pool 59 is also provided as described. Then relativistic charged particles, e.g., high energy protons are injected through guide tube 23 to form E-layer 22 so that the magnetic field thereof interacts with the external field to define a potential well 27.

Now fusionable fuel, e.g., frozen 50:50, TD pellets are directed through tube 24 into the E-layer region where they are vaporized, ionized and heated to reaction temperatures and are trapped in well region 27 by interaction with the E-layer particles. The well-known reaction, $T+D=n+{}^4He$, then occurs, upon attainment of requisite temperature and density conditions, with the 14.1 mev. neutron emanating from the plasma to impinge principally on blanket region 57 and pool 59. Therein the energetic neutrons generate heat by moderating collisions and create tritium by wellknown reactions. As the conclusion of the reaction, solenoid 61 may be energized to expel residual plasma as described and the cycle may then be repeated.

In the absence of cladding and structural material in the blanket, nothing is left between the molten lithium and the plasma except the E-layer. However, the E-layer now performs the task of serving as a vacuum wall isolating the plasma from the lithium vapor generated at the surface of the blanket and from any spillage of molten lithium near the proton and pellet injection tubes in the event that these tubes penetrate the blanket region. The rate of evaporation (W) of liquid lithium is given by the equation (I) $$\log W = A - \frac{B}{T} - \frac{1}{2} \log T + c$$

where W is expressed in grams per cm.² per sec., T is the liquid temperature in ° K., and the constants A, B, c for lithium are 10.50, 7480, and —3.8133, respectively. At a temperature of 440° C. (713° K.), the evaporation rate for lithium is $W = 5 \cdot 5 \cdot 10^{-6}$ g. per cm.² per sec. The internal surface area of the blanket for the example given hereinafter is approximately 50 m.². Thus the total rate of evaporation $W_{tot} \approx 3$ g. per sec.

The mean velocity of the lithium vapor at 440° C. is approximately 40 cm. per msec. The ionization cross section for lithium by 1-geV. protons is approximately $\sigma_i = 4 \cdot 10^{-19}$ cm.². For the design parameters shown in FIG. 2, the E-layer density ($n_e$) at its outer radius is approximately $5 \cdot 10^{11}$ protons per cm.³. The probable ionization time therefore is (II) $$t_i = (0.9 \, n_e \sigma_i c)^{-1} = 185 \, \mu\text{sec.}$$

During time $t_i$, the average penetration ($d$) in the E-layer of the lithium vapor traveling at a velocity of 40 cm. per msec. is $d = 7.4$ cm. The thickness of the E-layer between the blanket and the plasma is approximately 50 cm. Thus there is adequate protection from leakage of lithium vapor to the plasma.

Before calculating this vapor leakage, we shall calculate the lithium plasma density generated in the E-layer. The energy loss of relativistic protons to the lithium plasma is approximately 300 ev. per msec. per ion. Since only one electron is free and the two others are bound, only 100 ev. per msec. per lithium ion is deposited in the form of kinetic energy to the free electron of each lithium ion. The time ($t$) in msec. required to eject the lithium ions from the E-layer is given by the following equations for the ion temperature ($T_{Li}$) and velocity ($U_{Li}$):

(III) $$T_{Li} = \frac{1}{2} \dot{T} \cdot t, \text{ in ev.}$$

(IV) $$U_{Li} = 7 T_{Li}^{1/2}, \text{ in m. per msec.}$$

where $\dot{T} \approx 100$ ev. per msec. per ion pair and $t$ is the residence time of the lithium ions in the E-layer in msec. Assuming that the residence time $t$ is longer than the time required for equipartition of energy between lithium plasma electrons and ions and that the ions travel a length ($s$) before they leave the E-layer, we find that (V) $$s = 5 \dot{T}^{1/2} \int t^{1/2} dt$$

and (VI) $$T_{Li} = 0.22 \, (s\dot{T})^{2/3}$$

The length $s$ is approximately 1 mω, $\dot{T} \approx 100$ ev. per msec. Thus, (VII) $$T_{Li} \approx 5 \text{ ev.}$$

At the same time, the loss of E-layer protons is 30 ev. per lithium ion. Since the probable ionization time is 185 μsec., the loss of E-layer protons up to ionization is approximately 56 ev. per lithium atom. Thus the total loss per lithium atom is approximately 86 ev.

The residence time of the lithium ions in the E-layer, according to the above equation, is $t = 100$ μsec. In 100

μsec., approximately $5 \cdot 10^{-10}$ g. of lithium vapor per cm.$^2$ penetrate the E-layer. The lithium plasma thickness is approximately 7 cm.; thus, the lithium plasma density is $7 \cdot 10^{-11}$ g. per cm.$^3$ or $6 \cdot 10^{12}$ ions per cm.$^3$. At this density, the probable ionization time of a lithium atom by the plasma electrons is of the order of 100 μsec., which results in further reduction of the lithium plasma thickness. Consequently, the D-T plasma is separated from the lithium blanket by 8 to 10 mean free paths of lithium atoms. The lithium vapor leakage to the plasma therefore should be less than $2 \cdot 10^{-9}$ g. per cm.$^2$ per sec., or less than $2 \cdot 10^{14}$ ions per cm.$^2$ per sec. Since the plasma lifetime is approximately 35 msec. and its mean thickness is about 60 cm., the lithium plasma density of $10^{11}$ ions per cm.$^3$, i.e., 1 lithium ion per 40,000 plasma ions.

The power loss of the E-layer to the lithium vapor is $W_{E1} = (8.5 \cdot 10^{22}) \, 1.4 \cdot 10^{-17}$ w. per g., or $W_{E1} = 1.2$ mw. per g. of lithium vapor. The evaporation rate is 3 g. per sec. If we assume an equal amount as the result of spilling around the proton and fuel injection tubes, the total E-layer loss is less than 8 mw., which is less than 1% of the energy loss to the D-T plasma while at least about 99.9% of the lithium vapor is repelled away from the reaction plasma.

The lithium plasma, which is rather resistive, at the same time performs one of the functions performed by resistors in the 6-mev. electron Astron experimental facility disclosed in U.S. Pat. No. 3,036,963 cited above, namely, to damp the precessional oscillations of the E-layer. The blanket itself is confined within the magnetic lines, for the kinetic energy of the lithium is a small part of the energy density of the magnetic field. At the surface of the blanket the magnetic field intensity is approximately 130 kg. At a velocity of 30 m. per sec. for the lithium, the kinetic energy of the molten lithium is approximately 0.22 j. per cm.$^3$, while the energy density of the magnetic field is approximately 70 j. per cm.$^3$. Thus the kinetic energy of the lithium is less than 1% of the energy density of the magnetic field. Any motion of the lithium at a velocity $v$, transverse to the magnetic lines, will generate an electric field (VIII) $$E = \frac{v}{c} \times B$$

The electric field E will generate a current density ($\sigma E$) which, acting upon the field, creates a retarding force (IX) $$\vec{F} = -\frac{\vec{u}}{c^2} \sigma B^2$$

The deceleration $\dot{u}$ is (X) $$\dot{u} = -\overline{u}(4\pi\sigma)\left(\frac{B^2}{4\pi\rho c^2}\right)$$

Integrating Eq. X, we fined an exponential decay of the velocity with a time constant (XI) $$\tau = \left[(4\pi\sigma)\left(\frac{B^2}{4\pi\rho c^2}\right)\right]^{-1}$$

and a decay length ($u_0\tau$) where $u_0$ is the initial transverse velocity of the blanket. At a temperature of a few hundred ° C., the conductivity of liquid lithium is approximately $10^{16}$ e.s.u. Substituting in Eq. XI the numerical values B=130,000 gauss and $\rho$=0.5 g. per cm.$^3$, we find that $\tau$=2.6 μsec. In such a short time, the magnetic field would hardly penetrate the lithium. Thus the transverse motion of the lithium blanket surrounding the E-layer will be reversed by the compressed magnetic field. Since the kinetic energy of the lithium blanket is small with respect to the energy density of the magnetic field, the lithium will be repelled to restore its original position after it travels only a fraction of a centimeter.

Further details of the invention will be set forth in the following description of an illustrative example.

EXAMPLE

Structural dimension shown in FIG. 2 are as follows:

Plasma 28a central radius: 80 cm.
Plasma 28a and E-layer 22a inner radius: 35 cm.
Plasma outer radius: 125 cm.
E-layer 22a outer radius: 175 cm.
Blanket thickness: 50 cm.
Aluminum shield 21a thickness: 20 cm.
Aluminum coil 13a thickness: 145 cm.
Plasma 28a half length: 90 cm.
E-layer 22a half length: 125 cm.
Internal length blanket 51a: 400 cm.
External length blanket 51a: 500 cm.
Central external field intensity: 62 kilogauss.
Field intensity at periphery of E-layer 22a: 132 kilogauss.
Field intensity at inner marginal boundary of E-layer 22a and plasma 28a (reversed polarity): 200 kilogauss.
Plasma density: $4 \cdot 10^{15}$ ions per cm.$^3$.
Plasma temperature: T=20 kev.
Plasma lifetime: $T_p$=35 msec.
Power generated by $\alpha$ particles: 3,000 mw.
Neutron power: 12,000 mw.
Blanket power density: ~600 mw. per m.$^2$.
Peak plasma power density ($\alpha$ particles and neutrons): 4,800 w. per cm.$^3$.
Plasma volume: 6.2 m.$^3$.
Plasma fusion power: 15,000 mw. thermal.
Mean free path 14 mev. neutrons in lithium: 10 cm.
Molten lithium temperature maximum: ~426° C. (800° F.)
Superheat steam temperature: ~750–760° F.
With blanket thickness min. (blanket thickness of 75 cm. preferred for minimizing heat deposition in shield and solenoid): 50 cm.
Energy deposition at blanket surface: 1300 watts cm.$^3$.
Fluid flow (molten lithium): 30 meters/sec.
Molten lithium exposure to neutron flux per pass: ~60 millisec.
Energy deposition per pass: 78 joules/cm.$^3$=19 cal./cm.$^3$.
Heat capacity of lithium: ~0.5 cal./cm.$^3$.
Temperature rise in surface layers: ~38° C.
Overall temperature rise per pass: ~21° C.
Proton E-layer generated from 600 ma., 2 gev., $H_2^+$ beam.

The Bohm lifetime of the plasma is given by the equation (XII) $$T_B \approx \frac{2.5 B_0 R_p (R_p - R)}{uc}$$

where $u$ is the plasma temperature in e.s.u. and $c$ is the velocity of light, $B_0$ is the value of the magnetic field at the midplane at the outer radius of the E-layer, $R_p$ is the outer plasma radius, and R is the value at which the magnetic field is zero. Equation XII was derived for an aspect ratio of the plasma much longer than the present solution; therefore, the diffusion should be increased by approximately 50% and the coefficient 2.5 reduced to 1.6 for the present plasma parameters.

In the design shown in FIG. 2, the parameters are:

$B_0$=132,000 gauss
$R_p$=125 cm.
R=80 cm.

Substituting in Eq. XII we find that $$T_B \approx 1.2(10/u) \text{ msec.}$$

where $u$ is expressed in kev. At $u$=20 kev, $T_B$=0.6 msec. The peak energy deposited in the plasma by the $\alpha$ particles is 960 w. per cm.$^3$, or an average energy of 480 w. per cm.$^3$. The average energy stored in the plasma is 18 j. per cm.$^3$. The allowed plasma lifetime therefore is $$T_f = 37.5 \text{ msec.}$$

which must be modified by coulomb losses of the E-layer (approximately 10% of the energy deposited by the α particles) to become $$T_{f,E} = 35 \text{ msec.}$$

Thus anomalous plasma diffusion high enough to limit the plasma lifetime to 60 Bohm lifetimes can be tolerated. The plasma radius is now 50% larger than the value assumed by the original equation accounting for a reduction of the Bohm diffusion by a factor of 2.25. The magnetic field is higher by 35%, resulting in another reduction of the ratio ($T_f/T_B$) by a factor of 2.5 or, in all, a reduction by the factor of 6.

During plasma heating the pressure can be kept constant. At a temperature of 7 kev., for example—well above ignition temperature—the plasma density can be three times higher than at 20 kev., increasing the E-layer losses threefold and allowing a plasma lifetime of 60 Bohm lifetimes even if the heating from α particles is excluded. For the design shown in FIG. 2, assuming the parameters given in this section, the rate of plasma heating at the bottom of the magnetic well is approximately 250 ev. per msec. Thus, after injection of the D-T pellets, the plasma can reach ignition temperature in about 30 msec. During plasma heating, the loss rate from the E-layer increases by a factor of 3 to 4. There is no need, however, to increase the accelerator power during this time. The energy stored in the E-layer is 1,600 mj. The energy stored in the plasma at full pressure is approximateyl 110 mj. A slight depletion of the E-layer during the plasma formation can provide the energy required to heat the plasma to ignition temperature.

At this point the overall power balance and the net generated electric power can be calculated as follows:

|  | Mw. |
|---|---|
| Fusion neutron energy | 12,000 |
| α-Particle energy | 3,000 |
| Blanket reactions (6) | 3,000 |
| E-layer losses—1,200 mw. | |
| E-layer energy escaping as neutrinos (approximately)—200 mw. | |
| E-layer energy deposited in the plasma | 300 |
| E-layer energy deposited in the coils | 700 |
| Aluminum coil (resistive loss) | 200 |
| Total thermal input | 19,200 |

Relative to the E-layer losses, energy stored in the E-layer is 1,600 mj., energy stored in the E-layer protons traveling within the plasma volume is 800 mj., and the average proton lifetime is 1.3 sec.

The energy carried away by the plasma is 3,300 mw. or approximately 17% of the total. This is enough to superheat the steam to a temperature difference of approximately 180° F. from the initial superheating to the re-heating that follows first expansion of the steam. The heat deposited in the liquid lithium blanket is about 13,500 mw., the balance being deposited in the aluminum shield and coil. The heat carried along by the lithium and that deposited in the solenoid are used to generate and superheat the saturated steam to 750–760° F. It is desirable that the liquid lithium temperature not exceed 800° F. (426° C.). The volume of liquid lithium passing by the plasma region is approximately 300 m.³ per sec., resulting in a temperature rise of 21° C. Thus the average temperature of the lithium blanket on entry into the plasma region is 405° C. The temperature of the blanket surface in the vicinity of the E-layer rises to 442° C.

Calculations at this point yield:

| | | |
|---|---|---|
| Generated electric power at 40% efficiency (steam pressure, 2,500 p.s.i.; temperature, 950° F.), mw | | 7,680 |
| Power for proton accelerator, mw | 2,000 | |
| Aluminum coil power, mw | 200 | |
| Auxiliaries, mw | 180 | 2,380 |
| Net generated electric power, mw | | $W_e = 5,300$ |
| Net tritium breeding per year, g | | $G_T = 600,000$ |

The power calculation for the proton accelerator assumes a total efficiency of 60%.

A brief mention of the minimum feasible power level for an Astron reactor is warranted. If an E-layer with a proton energy as low as 480 mev. is stable at the degree of field reversal shown for the foregoing, then a heat source design dimensions in FIG. 2 but with only two-thirds the magnetic field can generate enough thermal power to provide a net electric power of 1,000 mw. The energy stored in the E-layer is reduced to 510 mj. The requirement for the proton E-layer becomes the equivalent of 960 mev. molecular hydrogen ($H_2^+$) at a beam current of 240 ma. or two accelerators 120 ma. each.

While molten lithium metal has been disclosed for use in a combination heat exchanger-breeder blanket other conductive fluids such as other metals in the liquid state, as well as molten salt solutions, metallic alloy mixtures and the like may also be used as may be individual lithium isotopes. Moreover, a material such as niobium may be used, e.g., to clad internal surfaces of the shield ring 21, e.g., to minimize interaction with lithium vapor, since activation of such materials disposed behind the blanket may be reduced to relatively insignificant levels.

While there has been described in the foregoing what may be considered to be preferred embodiments, modifications may be made therein without departing from the teachings of the invention and it is intended to cover all such as fall within the scope of the appended claims.

What I claim is:

1. A controlled fusion reactor comprising:
   solenoidal coil means arranged to produce an elongated axisymmetric magnetic field in an evacuated chamber, said magnetic field having a central region of relatively uniform intensity and first and second terminal magnetic mirror regions of increased magnetic field intensity encompassing a high temperature plasma containment zone, said magnetic field including a group of magnetic field lines extending in corresponding colinear relation from lower intensity end regions outwardly of said magnetic mirror field regions through said mirror fields and along said central field region in the area between said plasma containment zone and said solenoid;
   means for directing a stream of electrically conductive liquid into one end of said group of magnetic field lines to be guided thereby to flow successively through the first mirror field region, along the area between the plasma and solenoid constituting a blanket region, and thence through the second mirror field region and for discharging the flow from said group of magnetic field lines in the lower intensity region outwardly from the second mirror field; and
   means for introducing fusionable light nuclides into said containment zone to produce a high temperature controlled fusion plasma productive of radiant and particulate energy which impinges upon said conductive liquid flowing along the central field region, said conductive liquid thereby serving as a blanket for at least absorbing the energy emanating from said plasma.

2. A controlled fusion reactor as defined in claim 1 further defined in that said reactor is an Astron type reactor wherein further means are included for directing energetic particles into said magnetic field and for trapping said particles to form a toroidal E-layer of relativistic charged particles rotating about the axis in said central field region, wherefor the magnetic field of said E-layer interacts with the external magnetic field to produce a system of closed magnetic field lines defining a potential well serving as said plasma containment zone.

3. A controlled fusion reactor as defined in claim 2 further defined in that an annular magnetic field pervious conductive shield member is disposed along the central region between said solenoidal coil means and said group of colinear magnetic field lines.

4. A controlled fusion reactor defined in claim 3 further defined in that said conductive shield comprises an aluminum metal shield.

5. A controlled fusion reactor as defined in claim 3 further defined in that said means for directing a stream of conductive liquid into one end of said group of magnetic field lines and for discharging the flow from the other end each comprise a manifold or header means defining an annular bell shaped plenum disposed outwardly from a corresponding one of said magnetic mirror field region and extending inwardly through said corresponding magnetic mirror region.

6. A controlled fusion reactor as defined in claim 5 wherein said conductive liquid comprises molten lithium metal.

7. A controlled fusion reactor as defined in claim 6 further defined in that said relativistic charge particles of the E-layer comprise a material selected from the group consisting of electrons, protons, deuterons, tritons and helium-3 ions and in that said fusionable light nuclides comprises a tritium-deuterium mixture forming a T-D reaction plasma productive of energetic neutrons which impinge upon said blanket region of the flowing molten lithium stream.

8. A controlled fusion reactor as defined in claim 7 further defined in that said means for directing molten lithium to flow along said group of colinear magnetic field lines further comprises a reservoir for containing a supply of molten lithium metal together with pump means for pumping the molten lithium into said manifold or header means at one end of said group of magnetic field lines and with other conduit means connecting with the other manifold or header means as a portion of a heat exchange circuit feeding back into said pump means.

9. A controlled fusion reactor as defined in claim 8 further defined in that said heat exchange circuit further includes at least one steam generator through which heated molten lithium is passed to return to said pump means.

References Cited

UNITED STATES PATENTS

| | | | |
|---|---|---|---|
| 3,036,963 | 5/1962 | Christofilos | 176—4 |
| 3,071,525 | 1/1963 | Christofilos | 176—4 |
| 3,117,912 | 1/1964 | Imhoff et al. | 176—5 |
| 3,624,239 | 11/1971 | Fraas | 176—1 |

REUBEN EPSTEIN, Primary Examiner

U.S. Cl. X.R.

176—7